(12) United States Patent
Sarvadevabhatla et al.

(10) Patent No.: US 12,315,264 B2
(45) Date of Patent: May 27, 2025

(54) SYSTEM AND METHOD FOR DETECTING AND TRACKING A TWO-WHEELER VEHICLE TRAFFIC VIOLATION USING A DEEP LEARNING MODEL

(71) Applicant: International Institute of Information Technology, Hyderabad, Hyderabad (IN)

(72) Inventors: Ravi Kiran Sarvadevabhatla, Hyderabad (IN); Aman Goyal, Ajmer (IN); Rohit Saluja, Hyderabad (IN); Dev Agarwal, Jaipur (IN)

(73) Assignee: INTERNATIONAL INSTITUTE OF INFORMATION TECHNOLOGY, HYDERABAD, Hyderabad (IN)

( * ) Notice: Subject to any disclaimer, the term of this patent is extended or adjusted under 35 U.S.C. 154(b) by 253 days.

(21) Appl. No.: 18/131,765

(22) Filed: Apr. 6, 2023

(65) Prior Publication Data

US 2024/0338947 A1    Oct. 10, 2024

(51) Int. Cl.
| | |
|---|---|
| *G06V 20/54* | (2022.01) |
| *G06V 10/25* | (2022.01) |
| *G06V 10/26* | (2022.01) |
| *G06V 10/766* | (2022.01) |
| *G06V 10/774* | (2022.01) |

(Continued)

(52) U.S. Cl.
CPC .............. *G06V 20/54* (2022.01); *G06V 10/25* (2022.01); *G06V 10/267* (2022.01); *G06V 10/766* (2022.01); *G06V 10/774* (2022.01); *G06V 20/56* (2022.01); *G06V 40/10* (2022.01); *G06V 2201/08* (2022.01)

(58) Field of Classification Search
CPC ...... G06V 20/54; G06V 10/25; G06V 10/267; G06V 10/766; G06V 10/774; G06V 20/56; G06V 40/10; G06V 2201/08; G06V 10/82
See application file for complete search history.

(56) References Cited

PUBLICATIONS

M. Arshad and P. Kumar, "Detection of Two-Wheeler Traffic Rule Violation Using Deep Learning," 2022 IEEE World Conference on Applied Intelligence and Computing (AIC), Sonbhadra, India, 2022, pp. 109-114, doi: 10.1109/AIC55036.2022.9848979 (Year: 2022).*

* cited by examiner

*Primary Examiner* — Matthew C Bella
*Assistant Examiner* — Janice E. Vaz

(57) ABSTRACT

Provided a method of detecting and tracking a traffic violation of vehicle associated with user through a trapezium shaped object based representation using a deep learning model. The method includes (i) detecting the user and the vehicle to generate a first rectangular bounding box and a second rectangular bounding box of a video, (ii) training the deep learning model by correlating historical trapezium based representations with historical rectangular bounding boxes over historical vehicles, and historical users, (ii) determining a trapezium based representation based on the bounding boxes, (iv) detecting a traffic violation of the vehicle by determining (a) triple-riding violation, if maximum number of intersection of units (IoU) are found by counting the first rectangular bounding box and the second rectangular bounding box, (b) a helmet violation by determining the user without a helmet, and (v) tracking the vehicle that performs the traffic violation based on corresponding trapezium based representation.

20 Claims, 7 Drawing Sheets

(51) Int. Cl.
*G06V 20/56* (2022.01)
*G06V 40/10* (2022.01)

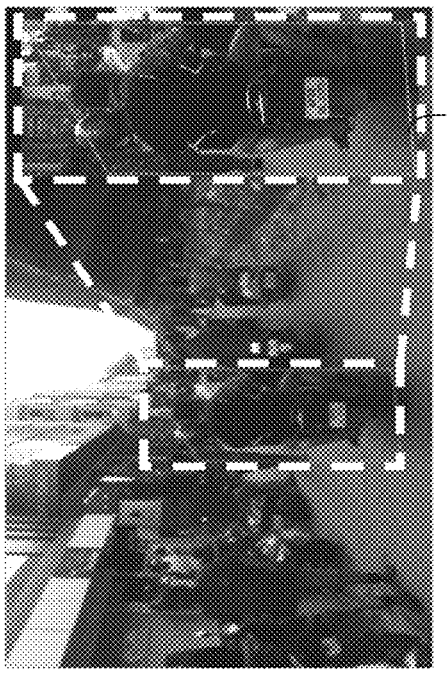
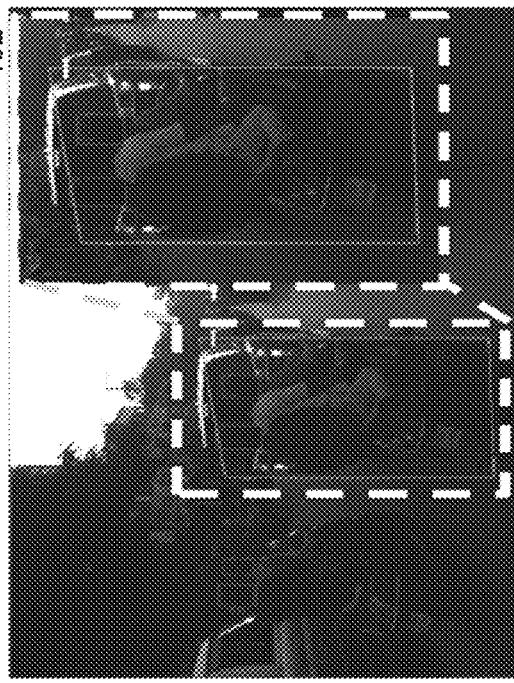
FIG. 4

DETECTING, USING A CURRICULUM LEARNING BASED OBJECT DETECTION METHOD, A USER AND A VEHICLE ASSOCIATED TO THE USER TO GENERATE A FIRST RECTANGULAR BOX OVER THE USER AND A SECOND RECTANGULAR BOX CORRESPONDING TO THE VEHICLE AT A DRIVING INSTANCE OF A FRAME OF AN INPUT OF THE VEHICLE ASSOCIATED WITH THE USER

502

DETERMINING, USING A TRAINED DEEP LEARNING MODEL, A TRAPEZIUM BASED REPRESENTATION FOR THE FIRST RECTANGULAR BOUNDING BOX AND THE SECOND RECTANGULAR BOUNDING BOX, THE DEEP LEARNING MODEL IS TRAINED BY CORRELATING HISTORICAL TRAPEZIUM BASED REPRESENTATIONS WITH HISTORICAL RECTANGULAR BOUNDING BOXES OVER HISTORICAL USERS OF HISTORICAL VEHICLES TO OBTAIN THE TRAINED DEEP LEARNING MODEL

504

FIG. 5A

AUTOMATICALLY DETECTING A TRAFFIC VIOLATION OF THE VEHICLE BY (I) DETERMINING A FIRST VIOLATION BY IDENTIFYING A MAXIMUM NUMBER OF INTERSECTION OF UNITS, THE MAXIMUM NUMBER OF INTERSECTION OF UNITS ARE IDENTIFIED BY COUNTING THE FIRST RECTANGULAR BOUNDING BOX AND THE SECOND RECTANGULAR BOX WITHIN THE TRAPEZIUM BASED REPRESENTATION, (II) DETERMINING A SECOND VIOLATION BY DETECTING THE USER WITHOUT A HELMET WITHIN THE TRAPEZIUM BASED REPRESENTATION

SYSTEM AND METHOD FOR DETECTING AND TRACKING A TWO-WHEELER VEHICLE TRAFFIC VIOLATION USING A DEEP LEARNING MODEL

BACKGROUND

Technical Field

The embodiments herein relate to a trapezium shaped object based representation, and more specifically to detect and track a traffic violation of vehicle associated with user through a trapezium shaped object based representation using a deep learning model.

Description of the Related Art

Automated road surveillance has become increasingly crucial as road crashes have become the 8th leading cause of death worldwide. A World Health Organization study on road safety claims that violations lead to 1.35 million fatalities and affect 50 million people yearly. Another recent report by World Bank mentions that more than 50% of road fatalities involve two-wheeler vehicles, also showing that 'no helmet' and triple-riding (more than two riders) violations are common causes. Studies carried out in Asian countries also account for two-wheeler vehicles among the significant share for road fatalities. Often, static cameras may not be present on the majority of the streets. Installing cameras everywhere may not be an economically viable and sustainable solution. Existing methods for triple-riding violations involve heuristic rules applied to output of rider detectors and show qualitative results for a few samples. In addition, the existing methods are not robust to occlusions and crowded scenes. For helmet violations, a majority of the existing methods perform classification over upper portions of predicted riders. The existing methods are not robust in crowded road scenarios. Existing works on helmet violations classify the ROIs generated from the upper portion of the detected riders. Such existing works are not robust to false negatives and false positives in the form of truncated heads in the cropped ROIs and riders of other motorcycles, respectively. Some conventional techniques utilize hand-engineered features such as scale-invariant feature transform, histogram of gradients etc. do not perform well on large-scale unconstrained and crowded road scenarios. Works of focus on detecting helmet violations directly from complete scene images. Such an approach leads to more false negatives and cannot detect violations for riders farther away from the camera. Apart from this, work by requires foreground segmentation as a step before detecting helmets/no helmets.

There are very few existing methods in the space of triple-riding violations. The method proposed detects violation on the lower portion of the motorcycle, is not robust to false positives as no counting algorithm is involved, and all the images used for qualitative analysis have similar camera angles and lighting conditions. The work focuses on using an association algorithm based on Euclidean distance after detecting motorcycle and rider boxes to count the number of riders on a motorcycle. It fails in fairly crowded road scenarios and lacks qualitative analysis on a large-scale dataset.

Accordingly, there remains a need for a more efficient system and method for mitigating and/or overcoming drawbacks associated with current methods.

SUMMARY

In view of the foregoing, an embodiment herein provides a method of automatically detecting a traffic violation of at least one vehicle associated with at least one user through a trapezium shaped object-based representation using a deep learning model. The method includes detecting, using a curriculum learning based object detection method, the at least one user and the at least one vehicle to generate a first rectangular bounding box over the at least one user and a second rectangular bounding box corresponding to the at least one vehicle at a driving instance of a frame of an input of the vehicle associated with the user. The input is a video that comprises a plurality of driving instances of the at least one vehicle and a plurality of frames. The method includes determining, using a trained deep learning model, a trapezium based representation based on the first rectangular bounding box and the second rectangular bounding box. The deep learning model is trained by correlating historical trapezium-based representations with historical rectangular bounding boxes over historical vehicles, and historical users to obtain a trained deep learning model. The method includes automatically detecting, using the trained deep learning model, the traffic violation of the at least one vehicle by (i) determining a first violation by identifying a maximum number of intersection of units (IoU), the maximum number of intersections are identified by counting the first rectangular bounding box and the second rectangular bounding box within the trapezium based representation, (ii) determining, using the trained deep learning model, a second violation by detecting the user without a helmet within the trapezium based representation.

In some embodiments, the method includes tracking the vehicle that performs the traffic violation based on corresponding trapezium based representation of the vehicle.

In some embodiments, the method further includes extracting a region of interest (ROI) for the first rectangular bounding box and the second rectangular bounding box using a width of the first rectangular bounding box and a height of the second rectangular bounding box at the driving instance.

In some embodiments, the method further includes training the deep learning model by correlating historical ROIs with historical users with the helmet and historical users without the helmet using a binary cross entropy method and a complete intersection over union method (CIoU).

In some embodiments, the IoU is determined by counting a number of intersections of the first rectangular bounding box within the trapezium based representation. In some embodiments, the method further includes determining the trapezium based representation by concatenating the first rectangular bounding box to obtain a centre of the trapezium (X, Y) using an equation, $X=[\Sigma_{i=0}^{n-1}(x_i+x_{i+1})(x_i y_{i+1}-x_{i+1} y_i)]/6A$, $Y=[\Sigma_{i=0}^{n-1}(y_i+y_{i+1})(x_i y_{i+1}-x_{i+1} y_i)]/6A$, where $(x_i, y_i)$ are vertices of the trapezium, and n=4, i=0 to (n−1), where A is a signed area of a polygon given by an equation $A=[\Sigma_{i=0}^{n-1}(x_i\ y_{i+1}-x_{i+1} y_i)]/2$.

In some embodiments, the method further includes representing the traffic violation by displaying the first violation using the trapezium based shaped representation all users associated with the at least one vehicle and the second violation as a rectangular shaped representation over each user of the vehicle.

In some embodiments, the method further includes, training the deep learning model by correlating historical rectangular boxes with historical users that are occluded in historical inputs using an amodal regression method.

In another aspect, there is provided a system for automatically detecting and tracking a traffic violation of at least one vehicle through a trapezium shaped representation over the at least one vehicle using a deep learning model. The system includes a processor and a memory that stores a set of instructions, which when executed by the processor, causes to perform: (a) detecting, using a curriculum learning based object detection method, the at least one user and the at least one vehicle to generate a first rectangular bounding box over the at least one user and a second rectangular bounding box corresponding to the at least one vehicle at a driving instance of a frame of an input of the vehicle associated with the user, the input is a video that comprises a plurality of driving instances of the at least one vehicle and a plurality of frames, (b) determining, using a trained deep learning model, a trapezium based representation based on the first rectangular bounding box and the second rectangular bounding box, the deep learning model is trained by correlating historical trapezium based representations with historical rectangular bounding boxes over historical vehicles, and historical users to obtain the trained deep learning model, (c) automatically detecting, using a trained deep learning model, a traffic violation of the at least one vehicle by (i) determining a first violation by identifying a maximum number of intersection of units (IoU), the maximum number of intersections are identified by counting the first rectangular bounding box and the second rectangular bounding box within the trapezium based representation, (ii) determining, using the trained deep learning model, a second violation by detecting the user without a helmet within the trapezium based representation.

In some embodiments, the processor is configured to extract a region of interest (ROI) for the first rectangular bounding box and the second rectangular bounding box using a width of the first rectangular bounding box and a height of the second rectangular bounding box at the driving instance.

In some embodiments, the processor is configured to train the deep learning model by correlating historical ROIs with historical users with the helmet and historical users without the helmet using a binary cross entropy method and a complete intersection over union method (CIoU).

In some embodiments, the IoU is determined by counting a number of intersections of the first rectangular bounding box within the trapezium based representation.

In some embodiments, the processor is configured to determine the trapezium based representation by concatenating the first rectangular bounding box to obtain a centre of the trapezium $(X, Y)$ using an equation, $X=[\Sigma_{i=0}^{n-1}(x_i+x_{i+1})(x_i y_{i+1}-x_{i+1} y_i)]/6A$, $Y=[\Sigma_{i=0}^{n-1}(y_i+y_{i+1})(x_i y_{i+1}-x_{i+1} y_i)]/6A$, where $(x_i, y_i)$ are vertices of the trapezium, and $n=4$, $i=0$ to $(n-1)$, where A is a signed area of a polygon given by an equation $A=[\Sigma_{i=0}^{n-1}(x_i\ y_{i+1}-x_{i+1} y_i)]/2$.

In some embodiments, the processor is configured to represent the traffic violation by displaying the first violation using the trapezium based shaped representation for all users associated with the at least one vehicle and the second violation as a rectangular shaped representation over each user of the vehicle.

In another aspect, there is provided one or more non-transitory computer-readable storage mediums storing the one or more sequences of instructions, which when executed by the one or more processors, causes automatically detecting a traffic violation of at least one vehicle through a trapezium shaped representation over the at least one vehicle using a deep learning model by (a) detecting, using a curriculum learning based object detection method, the at least one user and the at least one vehicle to generate a first rectangular bounding box over the at least one user and a second rectangular bounding box corresponding to the at least one vehicle at a driving instance of a frame of an input of the vehicle associated with the user, the input is a video that comprises a plurality of driving instances of the at least one vehicle and a plurality of frames, (b) determining, using a trained deep learning model, a trapezium based representation based on the first rectangular bounding box and the second rectangular bounding box, the deep learning model is trained by correlating historical trapezium based representations with historical rectangular bounding boxes over historical vehicles, and historical users to obtain the trained deep learning model, (c) automatically detecting, using the trained deep learning model, a traffic violation of the at least one vehicle by (i) determining a first violation by identifying a maximum number of intersection of units (IoU), the maximum number of intersections are identified by counting the first rectangular bounding box and the second rectangular bounding box within the trapezium based representation, (ii) determining, using the trained deep learning model, a second violation by detecting the user without a helmet within the trapezium based representation.

In some embodiments, the sequence of instructions further includes extracting a region of interest (ROI) for the first rectangular bounding box and the second rectangular bounding box using a width of the first rectangular bounding box and a height of the second rectangular bounding box at the driving instance.

In some embodiments, the sequence of instructions further includes training the deep learning model by correlating historical ROIs with historical users with the helmet and historical users without the helmet using a binary cross entropy method and a complete intersection over union method (CIoU).

In some embodiments, the IoU is determined by counting a number of intersections of the first rectangular bounding box within the trapezium based representation.

In some embodiments, the sequence of instructions further includes determining the trapezium based representation by concatenating the first rectangular bounding box to obtain a centre of the trapezium $(X, Y)$ using an equation, $X=[\Sigma_{i=0}^{n-1}(x_i+x_{i+1})(x_i y_{i+1}-x_{i+1} y_i)]/6A$, $Y=[\Sigma_{i=0}^{n-1}(y_i+y_{i+1})(x_i y_{i+1}-x_{i+1} y_i)]/6A$, where $(x_i, y_i)$ are vertices of the trapezium, and $n=4$, $i=0$ to $(n-1)$, where A is a signed area of a polygon given by an equation $A=[\Sigma_{i=0}^{n-1}(x_i\ y_{i+1}-x_{i+1} y_i)]/2$.

In some embodiments, the sequence of instructions further includes representing the traffic violation by displaying the first violation using the trapezium based shaped representation for all users associated with the at least one vehicle and the second violation as a rectangular shaped representation over each user of the at least one vehicle.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which:

FIG. 4 illustrates an exemplary representation of a triple riding violation and a helmet violation according to some embodiments herein;

FIGS. 5A and 5B are flow diagrams of a method for automatically detecting a traffic violation of a vehicle associated with a user through a trapezium shaped object based representation using a deep learning model according to some embodiments herein.

DETAILED DESCRIPTION OF PREFERRED EMBODIMENTS

Figure 1:
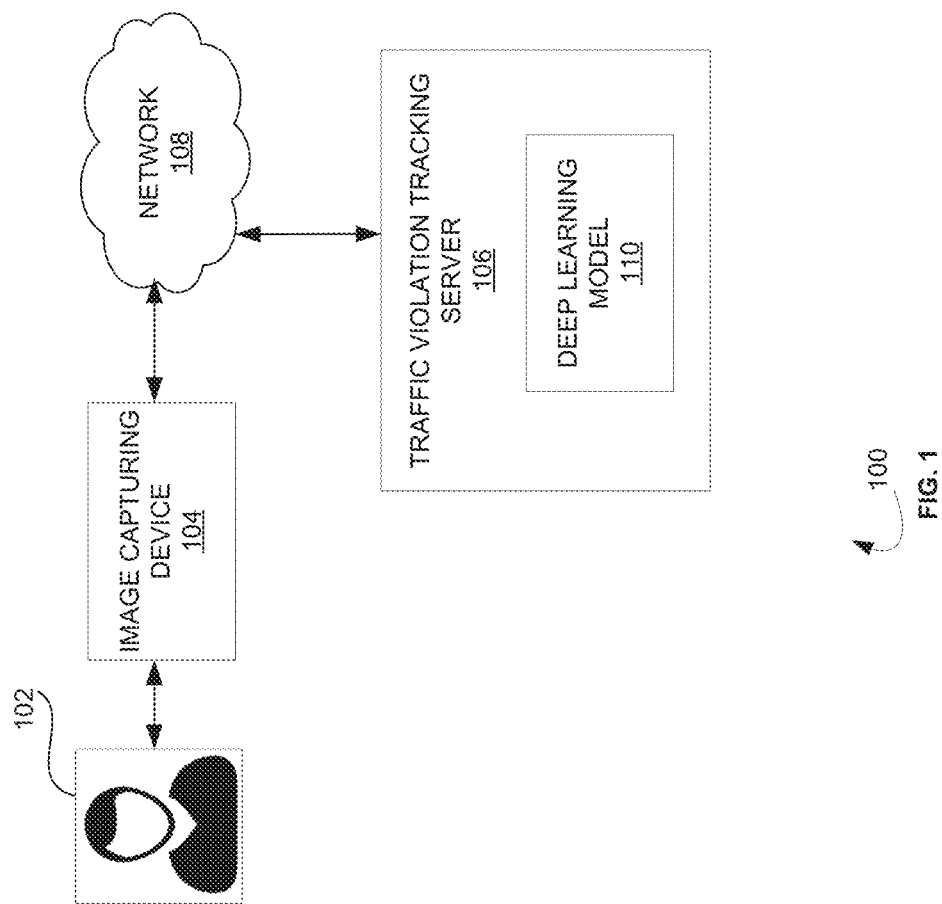
FIG. 1 is a schematic illustration of a system for automatically detecting a traffic violation of a vehicle associated with a user through a trapezium shaped object based representation using a deep learning model according to some embodiments herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

There remains a need for a system and method for tracking a traffic violation, and more specifically, detecting and tracking a traffic violation of a vehicle associated with a user through a trapezium shaped object based representation using a deep learning model. Referring now to the drawings, and more particularly to FIGS. 1 to 6, where similar reference characters denote corresponding features consistently throughout the figures, there are shown preferred embodiments.

FIG. 1 is a schematic illustration of a system 100 for automatically detecting a traffic violation of a vehicle associated with a user 102 through a trapezium shaped object based representation using a deep learning model 110 according to some embodiments herein. The system 100 includes an image capturing device 104, and a traffic violation tracking server 106. The traffic violation tracking server 106 includes a memory that stores a set of instructions, and a processor that is configured to execute the set of instructions to detect and track a traffic violation of the vehicle associated with the user 102. The traffic violation tracking server 106 may be an in-house server or a cloud server. The traffic violation tracking server 106 is communicatively connected with the image capturing device 104, via a network 110. The network 110 may be a local area network (LAN), a wide area network (WAN), a public network, a private network, a proprietary network, a Public Telephone Switched Network (PSTN), the Internet, a wireless network, a virtual network, a wired network or any combination thereof. The image capturing device 104 may be at least one of a camera, IR camera, thermal camera, night vision camera, optical sensor, mobile phone, Smartphone, or any kind of imaging device.

The image capturing device 104 captures a video of traffic. The image capturing device 104 may be a dash board camera mounted within a police vehicle. The video may include one or more frames and one or more driving instances of the vehicle. The image capturing device 104 may be attached to closed circuit television (cctv) camera of a traffic signal pole.

The traffic violation tracking server 106 detects at least one user and the vehicle to generate a first rectangular bounding box over the at least one user and a second rectangular bounding box corresponding to the vehicle at a driving instance of a frame of the video using a curriculum learning based object detection method.

The deep learning model 110 is trained by correlating historical trapezium based representations with historical rectangular bounding boxes over historical vehicles, and historical users to obtain a trained deep learning model.

The traffic violation tracking server 106 determines a trapezium based representation based on the first rectangular bounding box and the second rectangular bounding box. The traffic violation tracking server 106 detects a first traffic violation of the vehicle. The first violation may be a triple-riding violation.

The first violation is determined by finding a maximum number of intersection of units (IoU). The maximum number of intersection of units (IoU) are found by counting the first rectangular bounding box and the second rectangular bounding box within the trapezium based representation. The traffic violation tracking server 106 detects a second traffic violation. The first violation may be a helmet violation. The second traffic violation of the vehicle is determined by determining the at least one user without a helmet within the trapezium based representation using the trained deep learning model. The traffic violation tracking server 106 tracks the vehicle that performs the traffic violation based on corresponding trapezium based representation of the vehicle.

In some embodiments, the method further includes extracting a region of interest (ROI) for the first rectangular bounding box over the at least one user and the second rectangular bounding box corresponding to the at least one vehicle using a width of the first rectangular bounding box and a height of the second rectangular bounding box at the driving instance.

In some embodiments, the deep learning model 110 is trained by correlating historical ROIs with historical users with helmets and historical users without helmets using binary cross entropy method and complete intersection over union method (CIoU). The binary cross entropy method may be used to compare each of the predicted users without helmets with the actual users without helmets to determine either 0 or 1. If the determined value is 0 then the prediction of the deep learning model is accurate and if the determined value is 1 then the prediction of the deep learning model 110 is inaccurate. The CIoU method may be used to check the level of overlap between a rectangular predicted box over the user without helmets and the actual rectangular box over the user without helmets.

In some embodiments, the IoU is determined by counting number of intersections of the first rectangular bounding box with the trapezium based representation.

In some embodiments, the traffic violation tracking server 106 determines the trapezium based representation over the at least one user and the at least one vehicle by concatenating the first rectangular bounding box to obtain a centre of the trapezium (X, Y) using an equation. $X=[\sum_{i=0}^{n-1}(xi+xi+1)(xiyi+1-xi+1yi)]/6A$, $Y=[\sum_{i=0}^{n-1}(yi+yi+1)(xiyi+1-xi+1yi)]/6A$, where $(x_i, y_i)$ are vertices of the trapezium, and n=4, where A is a signed area of a polygon given by an equation $A=[\sum_{i=0}^{n-1}(xi\ yi+1-xi+1yi)]/2$.

In some embodiments, the traffic violation tracking server 106 represents the traffic violation by displaying the triple riding violation using the trapezium based shaped representation of all users associated with the at least one vehicle and the helmet violation as a rectangular shaped representation over each user of the at least one vehicle.

In some embodiments, the deep learning model 110 is trained by correlating historical rectangular boxes with historical users that are occluded in historical inputs using amodal regression method. The amodal regression method may detect occluded users in the frame. The occluded users may be the users whose visuals are unidentifiable.

Figure 2:
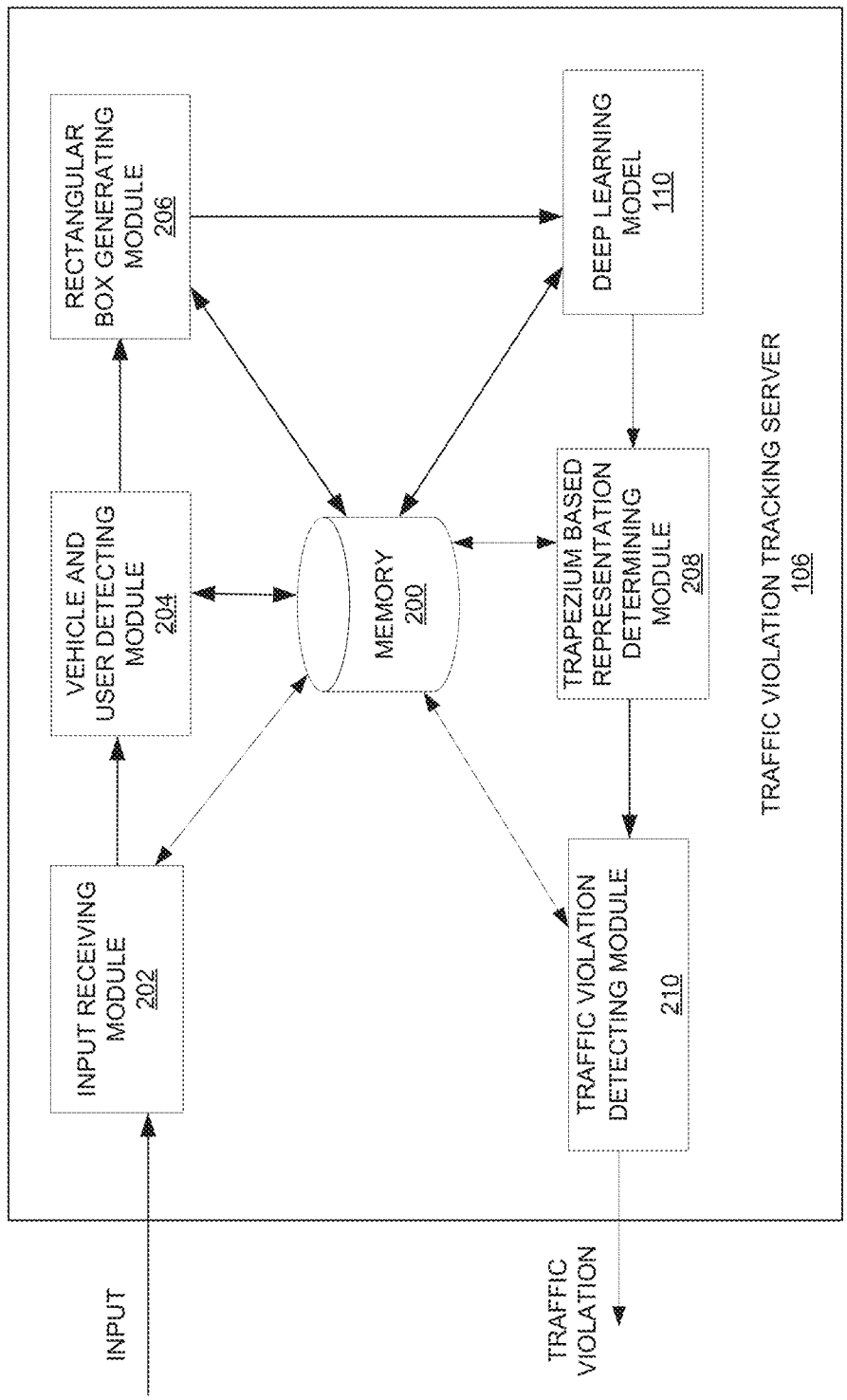
FIG. 2 is a block diagram of a traffic violation tracking server of FIG. 1 according to some embodiments herein.

FIG. 2 is a block diagram of a traffic violation tracking server 106 of FIG. 1 according to some embodiments herein. The traffic violation tracking server 106 includes an input receiving module 202, a vehicle and user detecting module 204, a rectangular bounding box generating module 206, the deep learning model 110, a trapezium based representation determining module 208, a traffic violation detecting module 210, and a memory 200. The input receiving module 202 receives an input from the image capturing device 104. The input may be a video. The video may include one or more frames and one or more driving instances of the vehicle.

The vehicle and user detecting module 204 detects at least one user and the vehicle using a curriculum learning based object detection method. The rectangular bounding box generating module 206 generates a first rectangular bounding box over the at least one user and a second rectangular bounding box corresponding to the vehicle at a driving instance of a frame of the video.

The deep learning model 110 is trained by correlating historical trapezium based representations with historical rectangular bounding boxes over historical vehicles, and historical users to obtain a trained deep learning model.

The trapezium-based representation determining module 208 determines a trapezium-based representation based on the first rectangular bounding box and the second rectangular bounding box. The traffic violation detecting module 210 detects a traffic violation of the vehicle by determining at least one triple-riding violation, if a maximum number of intersection of units (IoU) are found by counting the first rectangular bounding box and the second rectangular bounding box within the trapezium-based representation. The traffic violation detecting module 210 detects the traffic violation of the vehicle by determining a helmet violation by determining the at least one user without a helmet within the trapezium based representation. The traffic violation tracking server 106 tracks the vehicle that performs the traffic violation based on corresponding trapezium based representation of the vehicle.

Figure 3:
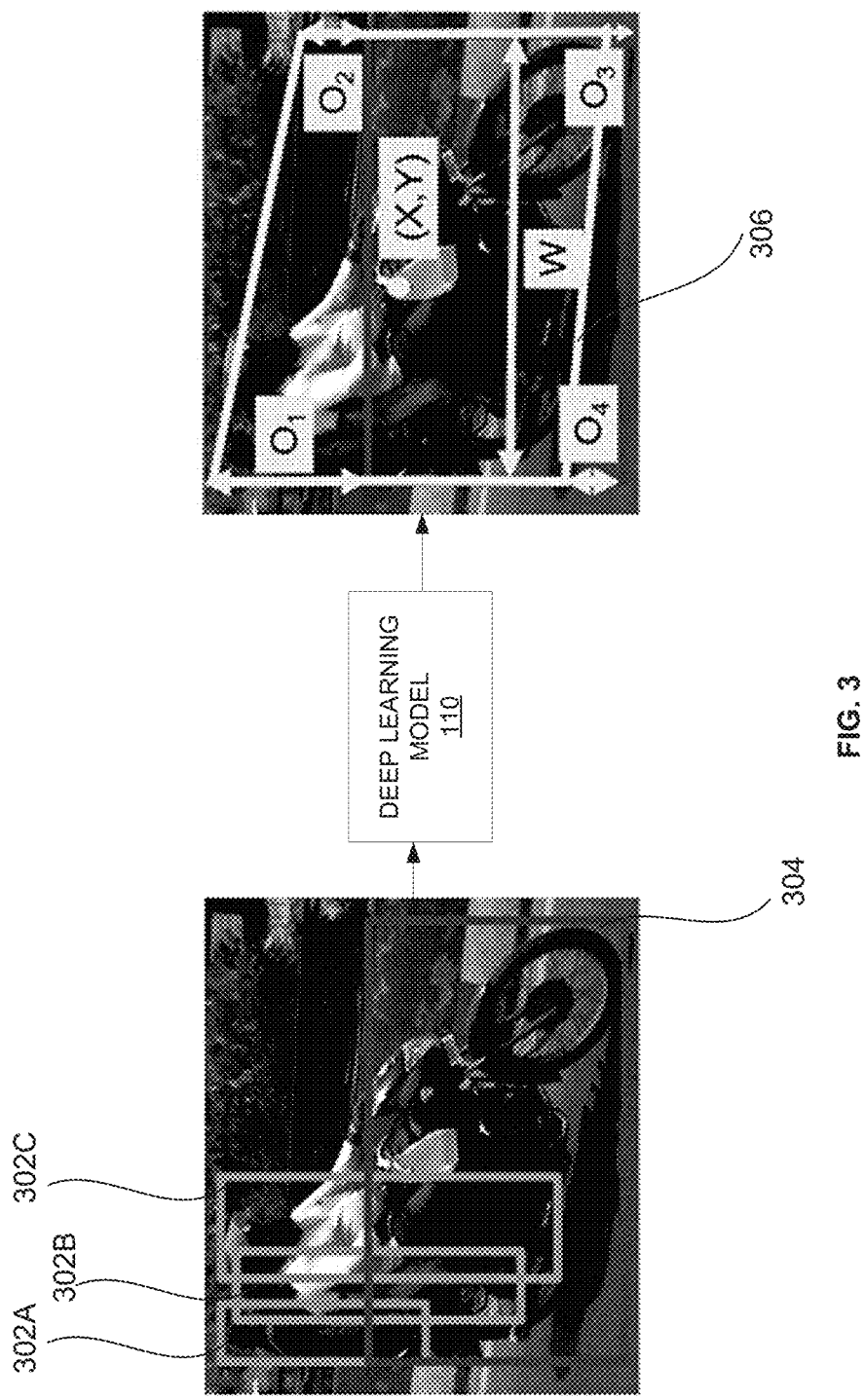
FIG. 3 is an exemplary representation of determining a trapezium based representation based on the first rectangular bounding box over the user and the second rectangular bounding box corresponding to the vehicle using the deep learning model, according to some embodiments herein.

FIG. 3 is an exemplary representation of determining a trapezium based representation based on the first rectangular bounding box over the user and the second rectangular bounding box corresponding to the vehicle using the deep learning model 110, according to some embodiments herein. The exemplary representation depicts a first rectangular bounding box over each user at 302A, 302B, and 302C. The exemplary representation depicts a second rectangular bounding box corresponding to the vehicle at 304. The deep learning model is trained by correlating historical trapezium based representations with historical rectangular bounding boxes over historical vehicles.

The exemplary representation depicts the trapezium based representation at 306 based on the first rectangular bounding box at 302A, 302B, 302C over each user and the second rectangular bounding box corresponding to the vehicle at 304. The trapezium based representation at 306 is determined by concatenating the first rectangular bounding box to obtain a centre of the trapezium (X, Y) using an equation, $X=[\sum_{i=0}^{n-1}(xi+xi+1)(xiyi+1-xi+1yi)]/6A$, $Y=[\sum_{i=0}^{n-1}(yi+yi+1)(xiyi+1-xi+1yi)]/6A$, where $(x_i, y_i)$ are vertices of the trapezium, and n=4, where A is a signed area of a polygon given by an equation $A=[\sum_{i=0}^{n-1}(xi\ yi+1-xi+1yi)]/2$. O1, O2, O3, O4 are the vertices of the trapezium, and W is the width of the trapezium.

FIG. 4 illustrates an exemplary representation of a triple riding violation and a helmet violation according to some embodiments herein. The exemplary representation depicts a trapezium based representation over the first rectangular bounding box over the user at 402. At 404, the exemplary representation depicts the triple riding violation. At 404, the exemplary representation depicts the maximum number of intersection of units (IoU) by counting the first rectangular bounding box and the second rectangular bounding box within the trapezium based representation.

At 406, the exemplary representation depicts the helmet violation. At 406, the exemplary representation depicts the users without helmet within the trapezium based representation. At 408, the exemplary representation depicts the triple-riding violation within the trapezium based representation. At 410, the exemplary representation depicts the helmet violation. At 412, the exemplary representation depicts the helmet violation.

The following table 1, and table 2 depict an evaluation of the triple-riding violation detection and counting users on the vehicle by comparing with existing techniques.

TABLE 1

| Rider-vehicle detection | mAP |
|---|---|
| Existing technique | 70.13% |
| System 100 | 82.61% |

TABLE 2

| Rider-Vehicle association approach | Triple-riding Violation identification scores | | |
|---|---|---|---|
| | Precision | Recall | F-Score |
| Rider motorcycle box | 33.73% | 53.84% | 41.47% |
| Rectangular-shaped instance box | 41.66% | 57.69% | 48.38% |
| Trapezium-shaped instance box | 84.44% | 73.07% | 65.95% |
| Euclidean distance | 29.00% | 50.00% | 36.70% |

The following table 3, table 4 depict an evaluation of the helmet violation detection and counting users on the vehicle by comparing with existing techniques.

TABLE 3

| Helmet/non-helmet detection | mAP |
|---|---|
| Existing technique | 83.5% |
| System 100 | 90.00% |

TABLE 4

| | Helmet Violation identification scores | | |
|---|---|---|---|
| ROI extraction | Precision | Recall | F-Score |
| Rider instance crop | 53.21% | 81.02% | 64.23% |
| Upper half instance crop | 49.9% | 76.40% | 60.36% |
| Full resolution image | 71.36% | 90.13% | 79.65% |
| Rider-vehicle instance crop | 99.01% | 95.23% | 97.08% |

FIGS. 5A and 5B are flow diagrams of a method for automatically detecting a traffic violation of a vehicle associated with a user through a trapezium shaped object based representation using a deep learning model according to some embodiments herein. At step 502, the method includes detecting, using a curriculum learning based object detection method, user and the vehicle to generate a first rectangular bounding box over the user and a second rectangular bounding box corresponding to the vehicle at a driving instance of a frame of an input of the vehicle associated with the user. The input is a video that includes a plurality of driving instances of the vehicle and a plurality of frames. At step 504, the method includes. determining, using a trained deep learning model, a trapezium based representation based on the first rectangular bounding box and the second rectangular bounding box. The deep learning model is trained by correlating historical trapezium based representations with historical rectangular bounding boxes over historical vehicles, and historical users to obtain the trained deep learning model. At step 506, the method includes detecting, using the trained deep learning model, a traffic violation of the vehicle by determining (i) a first violation by identifying a maximum number of intersection of units (IoU), the maximum number of intersection of units (IoU) are identified by counting the first rectangular bounding box and the second rectangular bounding box within the trapezium based representation, (ii) a second violation by detecting the user without a helmet within the trapezium based representation.

Figure 6:
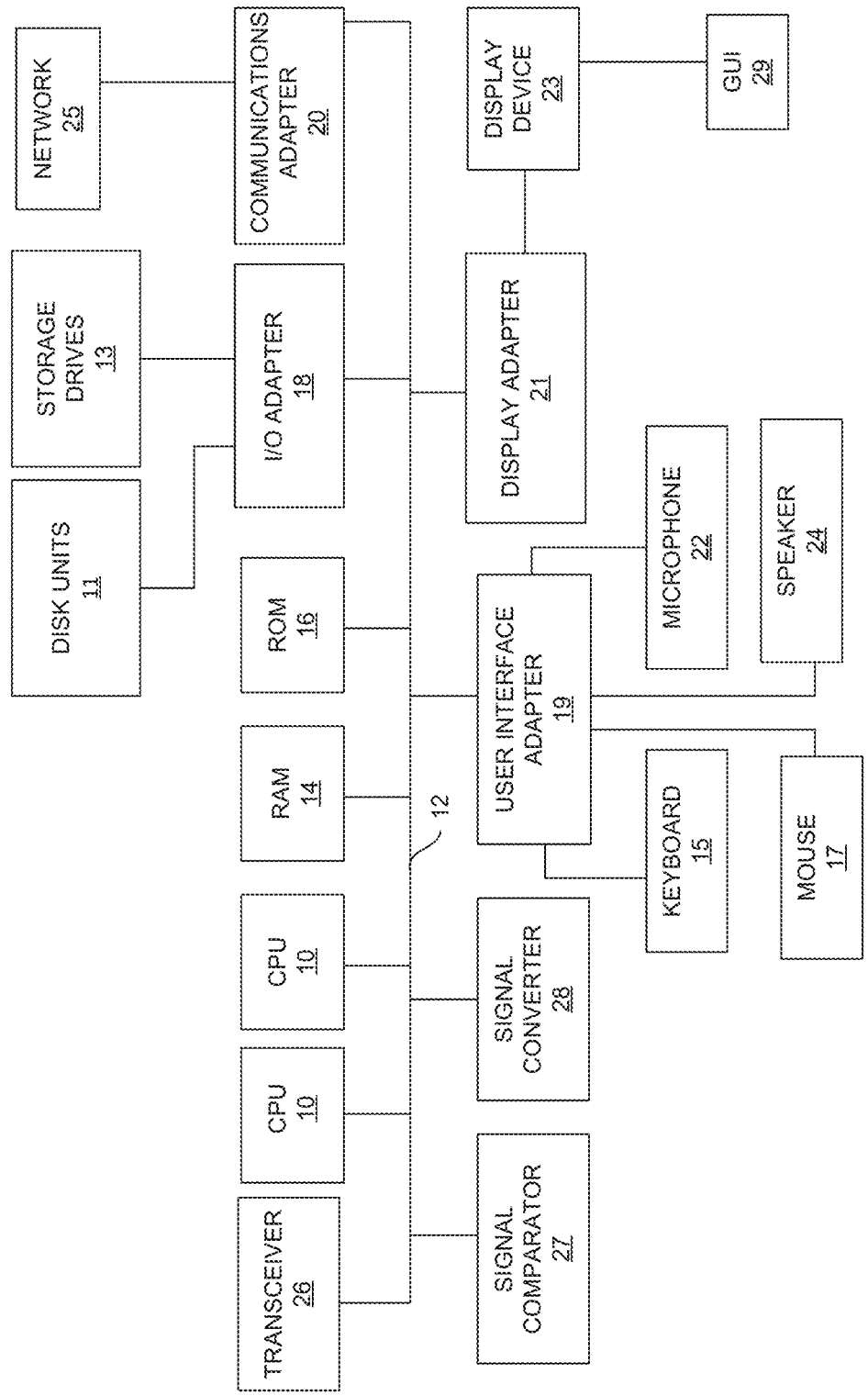
FIG. 6 is a schematic diagram of a computer architecture of the unique generated identifier server or one or more devices in accordance with embodiments herein.

A representative hardware environment for practicing the embodiments herein is depicted in FIG. 6, with reference to FIGS. 1 through 5A & 5B. This schematic drawing illustrates a hardware configuration of a traffic violation tracking server 106 or a computer system or a computing device in accordance with the embodiments herein. The system includes at least one processing device CPU 10 that may be interconnected via system bus 14 to various devices such as a random-access memory (RAM) 12, read-only memory (ROM) 16, and an input/output (I/O)) adapter 18. The I/O adapter 18 can connect to peripheral devices, such as disk units 38 and program storage devices 40 that are readable by the system. The system can read the inventive instructions on the program storage devices 40 and follow these instructions to execute the methodology of the embodiments herein. The system further includes a user interface adapter 22 that connects a keyboard 28, mouse 30, speaker 32, microphone 34, and other user interface devices such as a touch screen device (not shown) to the bus 14 to gather user input. Additionally, a communication adapter 20 connects the bus 14 to a data processing network 42, and a display adapter 24 connects the bus 14 to a display device 26, which provides a graphical user interface (GUI) 36 of the output data in accordance with the embodiments herein, or which may be embodied as an output device such as a monitor, printer, or transmitter, for example.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A processor-implemented method for automatically detecting a traffic violation of a vehicle associated with a user through a trapezium shaped object based representation using a deep learning model, comprising:

detecting, using a curriculum learning based object detection method, the user and the vehicle to generate a first rectangular bounding box over the user and a second rectangular bounding box corresponding to the vehicle at a driving instance of a frame of an input of the vehicle associated with the user, wherein the input is a video that comprises a plurality of driving instances of the vehicle and a plurality of frames;

determining, using a trained deep learning model, a trapezium based representation based on the first rectangular bounding box and the second rectangular bounding box, wherein the deep learning model is trained by correlating historical trapezium based representations with historical rectangular bounding boxes over historical vehicles, and historical users to obtain the trained deep learning model; and automatically detecting, using the trained deep learning model, the traffic violation of the vehicle by determining a first violation by identifying a maximum number of intersection of units (IoU), wherein the maximum number of intersection of units (IoU) are identified by counting the first rectangular bounding box and the second rectangular bounding box within the trapezium based representation, and determining, using the trained deep learning model, a second violation by detecting the user without a helmet within the trapezium based representation.

2. The processor-implemented method of claim 1, further comprising extracting a region of interest (ROI) for the first rectangular bounding box and the second rectangular bounding box using a width of the first rectangular bounding box and a height of the second rectangular bounding box at the driving instance.

3. The processor-implemented method of claim 1, further comprising training the deep learning model by correlating historical ROIs with historical users with the helmet and historical users without the helmet using a binary cross entropy method and a complete intersection over union method (CIoU)).

4. The processor-implemented method of claim 1, further comprising determining the trapezium based representation by concatenating the first rectangular bounding box to obtain a centre of the trapezium (X, Y) using an equation, $X=[\sum_{i=0}^{n-1}(xi+xi+1)(xiyi+1-xi+1yi)]/6A$, $Y=[\sum_{i=0}^{n-1}(yi+yi+1)(xiyi+1-xi+1yi)]/6A$, where (xi, yi) are vertices of the trapezium, and n=4, i=0 to (n−1), where A is a signed area of a polygon given by an equation $A=[\sum_{i=0}^{n-1}(xi\ yi+1-xi+1yi)]/2$.

5. The processor-implemented method of claim 1, wherein the IoU is determined by counting a number of intersections of the first rectangular bounding box within the trapezium based representation.

6. The processor-implemented method of claim 1, further comprising representing the traffic violation by displaying the first violation using the trapezium based representation for all users associated with the vehicle and the second violation as a rectangular shaped representation over each user of the vehicle.

7. The processor-implemented method of claim 1, further comprising training the deep learning model by correlating historical rectangular boxes with historical users that are occluded in historical inputs using an amodal regression method.

8. The processor-implemented method of claim 1, further comprising tracking the traffic violation of the vehicle based on corresponding trapezium based representation.

9. A system for automatically detecting a traffic violation of a vehicle associated with a user through a trapezium shaped object based representation using a deep learning model comprising, the system comprising:
   a memory storing a set of machine-readable instructions; and
   a processor configured to retrieve the machine-readable instructions from the memory which, when executed by the processor, enable the processor to:
      detect, using a curriculum learning based object detection method, at least one user and the vehicle to generate a first rectangular bounding box over the user and a second rectangular bounding box corresponding to the vehicle at a driving instance of a frame of an input of the vehicle associated with the user,
   wherein the input is a video that comprises a plurality of driving instances and a plurality of frames;
      determine, using a trained deep learning model, a trapezium based representation based on the first rectangular bounding box and the second rectangular bounding box, wherein the deep learning model is trained by correlating historical trapezium based representations with historical rectangular bounding boxes over historical vehicles, and historical users to obtain the trained deep learning model; and
      automatically detect, using the trained deep learning model, the traffic violation of the vehicle by
         determining a first violation by identifying a maximum number of intersection of units (IoU), the maximum number of intersections are identified by counting the first rectangular bounding box and the second rectangular bounding box within the trapezium based representation, and
         determining, using the trained deep learning model, a second violation by detecting the user without a helmet within the trapezium based representation.

10. The system of claim 9, wherein the processor is configured to extract a region of interest (ROI) for the first rectangular bounding box and the second rectangular bounding box using a width of the first rectangular bounding box and a height of the second rectangular bounding box at the driving instance.

11. The system of claim 9, wherein the processor is configured to train the deep learning model by correlating historical ROIs with historical users with helmet and historical users without helmet using a binary cross entropy method and a complete intersection over union method (CIoU).

12. The system of claim 9, wherein the processor is configured to determine the trapezium based representation by concatenating the generated rectangular bounding box to obtain a centre of the trapezium (X, Y) using an equation, $X=[\sum_{i=0}^{n-1}(xi+xi+1)(xiyi+1-xi+1yi)]/6A$, $Y=[\sum_{i=0}^{n-1}(yi+yi+1)(xiyi+1-xi+1yi)]/6A$, where (xi, yi) are vertices of the trapezium, and n=4, i=0 to (n−1), where A is a signed area of a polygon given by an equation $A=[\sum_{i=0}^{n-1}(xi\ yi+1-xi+1yi)]/2$.

13. The system of claim 9, wherein the IoU is determined by counting a number of intersections of the rectangular bounding box within the trapezium based representation.

14. The system of claim 10, wherein the processor is configured to represent the traffic violation by displaying the first violation using the trapezium based representation for all users associated with the vehicle and the second violation as a rectangular shaped representation over each user of the vehicle.

15. A non-transitory computer-readable storage medium storing a sequence of instructions, which when executed by a processor, causes automatically detecting a traffic violation of at least one vehicle associated with at least one user through a trapezium shaped object based representation using a deep learning model, said sequence of instructions comprising:
   detecting, using a curriculum learning based object detection method, the user and the vehicle to generate a first rectangular bounding box over the user and a second rectangular bounding box corresponding to the vehicle at a driving instance of a frame of an input of the vehicle associated with the user, wherein the input is a video that comprises a plurality of driving instances of the vehicle and a plurality of frames;
   determining, using a trained deep learning model, a trapezium based representation based on the first rectangular bounding box and the second rectangular bounding box, wherein the trained deep learning model is trained by correlating historical trapezium based representations with historical rectangular bounding boxes over historical vehicles, and historical users to obtain the trained deep learning model; and
   automatically detecting, using the trained deep learning model, the traffic violation of the vehicle by
      determining a first violation by identifying a maximum number of intersection of units (IoU), wherein the maximum number of intersections (IoU) are identified by counting the first rectangular bounding box and the second rectangular bounding box within the trapezium based representation, and
      determining, using the trained deep learning model, a second violation by detecting the user without a helmet within the trapezium based representation.

16. The non-transitory computer-readable storage medium storing a sequence of instructions of claim 15, wherein the method comprises extracting a region of interest (ROI) for the first rectangular bounding box and the second rectangular bounding box using a width of the first rectangular bounding box and a height of the second rectangular bounding box at the driving instance.

17. The non-transitory computer-readable storage medium storing a sequence of instructions of claim 15, wherein the method further comprises, training the deep learning model by correlating historical ROIs with historical users with helmet and historical users without helmet using a binary cross entropy method and a complete intersection over union method (CIoU).

18. The non-transitory computer-readable storage medium storing a sequence of instructions of claim 15, wherein the method further comprises, determining the trapezium based representation by concatenating the first rectangular bounding box to obtain a centre of the trapezium (X, Y) using an equation, $X=[\Sigma_{i=0}^{n-1}(xi+xi+1)(xiyi+1-xi+1yi)]/6A$, $Y=[\Sigma_{i=0}^{n-1}(yi+yi+1)(xiyi+1-xi+1yi)]/6A$, where (xi, yi) are vertices of the trapezium, and n=4, i=0 to (n−1), where A is a signed area of a polygon given by an equation $A=[\Sigma_{i=0}^{n-1}(xi\ yi+1-xi+1yi)]/2$.

19. The non-transitory computer-readable storage medium storing a sequence of instructions of claim 15, wherein the IoU is determined by counting a number of intersections of the first rectangular bounding box within the trapezium based representation.

20. The non-transitory computer-readable storage medium storing a sequence of instructions of claim 15, wherein the method further comprises representing the traffic violation by displaying the first violation using the trapezium based representation all users associated with the vehicle and the second violation as a rectangular shaped representation over each user of the vehicle.

* * * * *